3,527,848
β-AMIDO VINYL PHOSPHATES AND THEIR METHOD OF PREPARATION

Melancthon S. Brown, Berkeley, Calif., assignor to Chevron Research Company, San Francisco, Calif., a corporation of Delaware
No Drawing. Filed June 7, 1967, Ser. No. 644,063
Int. Cl. C07f 9/24, 9/58; A01n 9/36
U.S. Cl. 260—944                                    7 Claims

ABSTRACT OF THE DISCLOSURE

β-Amidovinyl thiophosphates of the formula

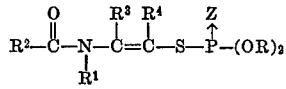

in which R is a hydrocarbyl radical, $R^1$ is a saturated aliphatic, cycloaliphatic or aryl radical, $R^2$, $R^3$ and $R^4$ are hydrogen, saturated aliphatic, cycloaliphatic or aryl radical, with the proviso that $R^1$ and $R^2$ may be joined to form an alkylene radical and Z is oxygen or sulfur. Compounds of this class are insecticidal and may be made by reacting an appropriate N-vinyl amide with a phosphorane sulfenyl halide.

FIELD OF INVENTION

This invention is directed to novel β-amido vinyl phosphates and their preparation from N-vinyl amides and phosphorane sulfenyl halides.

DESCRIPTION OF INVENTION

The novel phosphates of this invention are β-amidovinyl thiophosphates and dithiophosphates in which the α-carbon atom of the vinyl group is bound to the sulfur atom bonded singly to phosphorous, the nitrogen atom of the amido radical is substituted by a saturated aliphatic, cycloaliphatic or aryl group and the total number of carbon atoms in the amido radical is less than about 20.

These compounds may be made by reacting a phosphorane sulfenyl halide in which the halogen has an atomic number of 17 to 35, i.e., chlorine and bromine, with an N-vinyl amide in which the nitrogen is substituted with a saturated aliphatic, cycloaliphatic or aryl radical in addition to the vinyl radical and the total number of carbon atoms of the amide, including the vinyl radical, is less than about 22, in an inert solvent. This reaction is surprising in that sulfenyl halides conventionally react with olefinic unsaturation to give a saturated addition product.

Preferred β-amidovinyl thiophosphates of this invention are represented by the general formula:

(1)

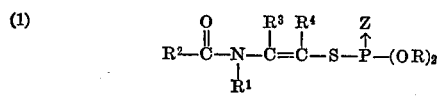

in which R is a hydrocarbyl radical of 1 to about 15 carbon atoms, Z is a chalcogen atom of atomic number 8 to 16, i.e., O or S, $R^1$ is a saturated aliphatic, cycloaliphatic or aryl radical containing 1 to about 15 carbon atoms and $R^2$, $R^3$ and $R^4$ are individually hydrogen, a saturated aliphatic, cycloaliphatic or aryl radical having 1 to about 15 carbon atoms, with the proviso that $R^1$ and $R^2$ may be joined to form an alkylene radical of 2 to about 6 carbon atoms. Particularly, preferred β-amidovinyl thiophosphates are those in which Z is oxygen, R is alkyl, cycloalkyl or phenyl, $R^1$ and $R^2$ are each alkyl of 1 to 4 carbon atoms or are joined to form an alkylene radical having 2 to 3 carbon atoms and $R^3$ and $R^4$ are hydrogen.

The preferred β-amidovinyl thiophosphates of the above formula may be made by reacting a phosphorane or thionophosphorane sulfenyl halide of the general formula (2)

wherein R and Z are as previosuly defined and X is halogen having an atomic number from 17 to 35, with an N-vinyl amide of the general formula (3)

wherein $R^1$, $R^2$, $R^3$ and $R^4$ are as previously defined.

Examples of the specific radicals which R in the above formulas may represent are aliphatic hydrocarbyl groups such as methyl, ethyl, isopropyl, sec. butyl, hexyl and vinyl, cycloaliphatic groups such as cyclobutyl, cyclohexyl and cyclooctyl, and aryl groups such as phenyl, tolyl and benzyl. Illustrative of radicals which $R^1$, $R^2$, $R^3$ and $R^4$ may represent are methyl, ethyl, chloroethyl, isopropyl, hexyl, octyl, cyclobutyl, cyclohexyl, phenyl, chlorophenyl, nitrophenyl, tolyl and xylyl. In the instance where $R^1$ and $R^2$ are joined they may be ethylene, propylene, butylene and the like.

Specific examples of β-amidovinyl thiophosphates represented by formula (1) are

O,O-dimethyl-β-(N-methylformamido)vinyl thiosphosphate,
O,O-dimethyl-β-(N-isopropylacetamido)vinyl dithiophosphate,
O-ethyl-O-methyl-β-(N-2-chloroethylpropionamido)vinyl thiophosphate,
O,O-diethyl-β-(N-butylpropionamido)vinyl dithiophosphate,
O,O-dibutyl-β-(N-methylvaleramido)vinyl thiophosphate,
O,O-dicyclohexyl-β-(N-hexylacetamido)vinyl thiophosphate,
O,O-diphenyl-β-(N-methylacetamido)vinyl thiophosphate,
O,O-diisopropyl-β-(N-ethylbenzamido)vinyl thiophosphate,
O,O-diethyl-β-(N-ethylcyclohexanamido)vinyl thiophosphate,
O,O-dibutyl-β-(N-cyclohexyl-2-naphthamido)vinyl thiophosphate,
O,O-dimethyl-α-methyl-β-(N-methylacetamido)vinyl thiosphophate,
O,O-dimethyl-α-butyl-β-(N-methylbenzamido)vinyl thiophosphate,
O,O-diethyl-α-cyclohexyl-β-(N-phenylacetamido)vinyl dithiophosphate,
O,O-diisopropyl-α-phenyl-β-ethyl-β-(N-ethylacetamido)vinyl thiophosphate and
O,O-dimethyl-α-ethyl-β-phenyl-β-(N-ethylacetamido)vinyl thiophosphate,
N-β-O,O-diphenylphosphorylthiovinyl-2-pyrollidone,
N-β-O,O-dibutylphosphorylthiovinyl-2-pyrollidone and
N-β-O,O-dimethylthionophosphorylthiovinyl-2-pyrollidone.

The reaction of this invention is carried out in inert solvents such as ethyl ether, dioxane, benzene, chloroform and methylene dichloride. The reaction temperature will normally be in the range of —20 to 50° C., preferably 0 to 25° C. The concentration of reactants is not critical; proportions approximating stoichiometric amounts will usually be employed. While it is desirable to run the reaction in the presence of an HCl acceptor such as a tertiary amine, e.g. trialkylamine, alkali metal carbonate, water, etc., an HCl acceptor is not necessary. In general, the β-amidovinyl thiophosphates are oils and may be separated from the reaction mixture by filtering off hydrochloride precipitates of the HCl acceptors and removing the solvent from the filtrate in vacuo.

EXAMPLES

The following examples further illustrate the novel β-amidovinyl thiophosphates of the invention and their method of preparation. These examples are intended only to illustrate this invention and are in no way meant to limit it. Unless otherwise indicated, percentages are by weight.

EXAMPLE 1

Fifteen grams of N-vinyl-N-methylacetamide in 200 ml. ethyl ether were charged to a flask immersed in an ice bath. 35 g. of diisopropylphosphorane sulfenyl chloride in 50 ml. ethyl ether were added slowly to the flask over about an hour. This mixture was stirred for one hour after adding the sulfenyl chloride. 15 g. of triethylamine were then added and the mixture was allowed to warm to ambient temperature and stand overnight. It was then filtered and washed with ethyl ether. The ether was removed under vacuum and the oily residue was dissolved in 200 ml. chloroform and washed three times with water. It was then dried, the chloroform was removed under vacuum and it was dried again at 80° C., 0.2 mm. Hg for 3 hours. 38.2 g. of O,O-diisopropyl-β-(N-methylacetamido)vinyl thiophosphate was recovered. Its S analysis was: calculated 10.83%; found 10.85%.

EXAMPLE 2

Fifteen grams of N-vinylpyrollidone in 200 ml. ethyl ether were placed in a flask immersed in an ice bath. 31 g. of diisopropylphosphorane sulfenyl chloride in 50 ml. ethyl ether were added slowly to the flask. The combined mixture was stirred for 1 hour after the sulfenyl chloride had been added. 15 g. of triethylamine were then added to the mixture and the flask was allowed to warm to ambient temperature and stand overnight. The mixture was then filtered and washed with ethyl ether. The ether was removed from the filtrate under vacuum leaving an oily residue. The residue was dissolved in chloroform and washed three times with cold water. It was dried, the chloroform removed under vacuum and dried again at 80° C., 0.2 mm. Hg for 3 hours. 36.3 g. of N - β - O,O-diisopropylphosphorylthiovinyl-2-pyrollidone was recovered. Its S analysis was: calculated 10.41%; found 10.12%.

Other β-amido vinyl thiophosphates included in this invention were prepared using the general methods described in Examples 1 and 2. These compounds and their analyses appear in Table I.

TABLE I

| Compound | Analysis | | | |
|---|---|---|---|---|
| | Percent S | | Percent N | |
| | Calcd. | Found | Calcd. | Found |
| O,O-diethyl-β-(N-methyl-acetamido)vinylthiophosphate | 11.98 | 11.52 | 5.25 | 5.09 |
| O,O-dimethyl-β-(N-methyl-acetamido)vinylthiophosphate | 13.38 | 12.22 | 5.85 | 5.66 |
| N-β-O,O-diethylphosphorylthiovinyl-2-pyrollidone | 11.50 | 11.52 | 5.02 | 5.09 |
| N-β-O,O-dimethylphosphorylthiovinyl-2-pyrollidone | 12.75 | 12.80 | 5.58 | 5.93 |
| N-β-O,O-diethylthionophosphorylthiovinyl-2-pyrollidone | 21.7 | 21.75 | | |

β-Amidovinylthiophosphates of this invention have exhibited insecticidal and acaricidal activity. Organisms which were significantly controlled by insecticidal or acaricidal amounts of these compounds of this invention included mites, flies, aphids, cockroaches and dockbeetles. In using these compounds as insecticides it is expected that they may be formulated in insecticidal or acaricidal amounts with various inert diluents, other biologically active compounds, stickers, surface active agents and the like. In this form they may be applied in toxic amounts to the insects, acarids, or their environments by methods and means established in the art.

I claim:
1. Compound of the formula

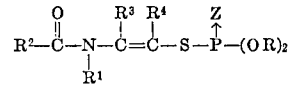

wherein Z is a chalcogen atom of atomic number 8 to 16, R is alkyl of 1 to 6 carbon atoms, cycloalkyl of 4 to 8 carbon atoms, phenyl tolyl or benzyl, $R^1$ is alkyl or chloroalkyl of 1 to 8 carbon atoms, cycloalkyl of 4 to 6 carbon atoms, phenyl, nitrophenyl, chlorophenyl, tolyl or xylyl and $R^2$, $R^3$ and $R^4$ are individually hydrogen, a saturated aliphatic, cycloaliphatic or aryl radical containing 1 to about 15 carbon atoms.

2. Compound of claim 1 wherein Z is oxygen, R is alkyl of 1 to 6 carbon atoms, cyclohexyl or phenyl, $R^1$ and $R^2$ are each alkyl of 1 to 4 carbon atoms and $R^3$ and $R^4$ are hydrogen.

3. Compound of claim 1 wherein Z is oxygen, R is methyl, ethyl or isopropyl, and $R^1$ and $R^2$ are methyl and $R^3$ and $R^4$ are hydrogen.

4. Method for preparing compounds of the formula

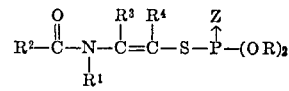

in which Z is a chalcogen atom of atomic number 8 to 16, R is alkyl of 1 to 6 carbon atoms, cycloalkyl of 4 to 8 carbon atoms, phenyl, tolyl or benzyl, $R^1$ is alkyl or chloroalkyl of 1 to 8 carbon atoms, cycloalkyl of 4 to 6 carbon atoms, phenyl, nitrophenyl, chlorophenyl, tolyl or xylyl and $R^2$, $R^3$ and $R^4$ are individually hydrogen, a saturated aliphatic, cycloaliphatic or aryl radical having 1 to about 15 carbon atoms, which comprises reacting a compound of the formula

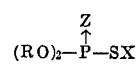

wherein X is halogen of atomic number 17 to 35 and R and Z are as previously defined, with a compound of the formula

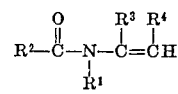

wherein $R^1$, $R^2$, $R^3$, and $R^4$ are as previously defined, in the presence of an inert solvent and an HX acceptor wherein X is as defined previously.

5. Method of claim 4 wherein the reaction is carried out at about −20 to 50° C.

6. Method of claim 4 wherein Z is oxygen, R is allyl of 1 to 6 carbon atoms, cyclohexyl or phenyl, $R^1$ and $R^2$ are each alkyl of 1 to 4 carbon atoms and $R^3$ and $R^4$ are hydrogen.

7. Method of claim 4 wherein Z is oxygen, R is methyl, ethyl or isopropyl, X is chlorine, $R^1$ and $R^2$ are methyl and $R^3$ and $R^4$ are hydrogen.

No references cited.

CHARLES B. PARKER, Primary Examiner

A. H. SUTTO, Assistant Examiner

U.S. Cl. X.R.

260—239, 293.4, 326.82, 971, 999

PO-1050
(5/69)

UNITED STATES PATENT OFFICE
CERTIFICATE OF CORRECTION

Patent No. 3,527,848                Dated September 8, 1970

Inventor(s) Melancthon S. Brown

It is certified that error appears in the above-identified patent and that said Letters Patent are hereby corrected as shown below:

Claim 6, Cclumn 4, line 1, "allvl" should read --alkyl--

Signed and sealed this 22nd day of June 1971.

(SEAL)
Attest:

EDWARD M. FLETCHER, JR.
Attesting Officer

WILLIAM E. SCHUYLER, JR.
Commissioner of Patents